(12) United States Patent
Arnason

(10) Patent No.: US 7,857,686 B2
(45) Date of Patent: Dec. 28, 2010

(54) METHOD AND AN APPARATUS FOR AUTOMATIC BONE REMOVAL

(75) Inventor: Ingolfur Arnason, Akranes (IS)

(73) Assignee: Skaginn HF, Akranes (IS)

( * ) Notice: Subject to any disclaimer, the term of this patent is extended or adjusted under 35 U.S.C. 154(b) by 549 days.

(21) Appl. No.: 11/792,699

(22) PCT Filed: Dec. 16, 2005

(86) PCT No.: PCT/IS2005/000027

§ 371 (c)(1),
(2), (4) Date: Sep. 13, 2007

(87) PCT Pub. No.: WO2006/064521

PCT Pub. Date: Jun. 22, 2006

(65) Prior Publication Data

US 2007/0293132 A1    Dec. 20, 2007

(30) Foreign Application Priority Data

Dec. 16, 2004  (IS) ......................................... 7602
Jul. 26, 2005   (IS) ......................................... 7959

(51) Int. Cl.
*A22C 25/16* (2006.01)
(52) U.S. Cl. .................................................... 452/161
(58) Field of Classification Search ......... 452/149–152, 452/155–158, 160–162
See application file for complete search history.

(56) References Cited

U.S. PATENT DOCUMENTS

| 3,800,363 | A  |   | 4/1974  | Lapeyre |
| 4,875,254 | A  | * | 10/1989 | Rudy et al. .................. 452/157 |
| 5,031,496 | A  | * | 7/1991  | Lobash et al. ................. 83/107 |
| RE33,904  | E  | * | 4/1992  | Rudy et al. .................. 452/150 |
| RE33,917  | E  | * | 5/1992  | Lapeyre et al. .............. 452/158 |
| 6,825,446 | B1 |   | 11/2004 | Arnarson et al. |

FOREIGN PATENT DOCUMENTS

EP        0 634 102 A    1/1995

OTHER PUBLICATIONS

Ujihira et al., "Study on freezing process of killifish egg: utilizing the undercooled state for cryopreservation," Database Medline Online!, US National Library of Medicine (NLM), Bethesda, MD, US, 1994.

* cited by examiner

*Primary Examiner*—Thomas Price
(74) *Attorney, Agent, or Firm*—Birch, Stewart, Kolasch & Birch, LLP.

(57) ABSTRACT

The present invention relates to a method for automatically removing bones and trimming a product such as fish fillets, where the fillets are in an under cooled state. The under cooling makes the fillets sufficiently stiff to remove pin pones and portion a fillet before or after skinning the fillet in a relative still position providing better cutting than conventional methods. This provides more efficiency than prior art methods as well as increasing the value of the product due to less gaping and dehydration of the product. The method of the present invention further provides possibilities for grading of products processed with the three dimensional scanning and digital imaging of the products.

23 Claims, 10 Drawing Sheets

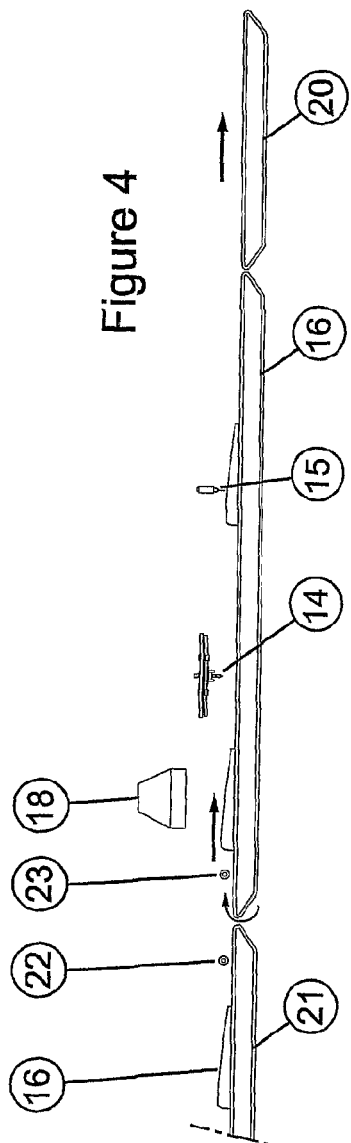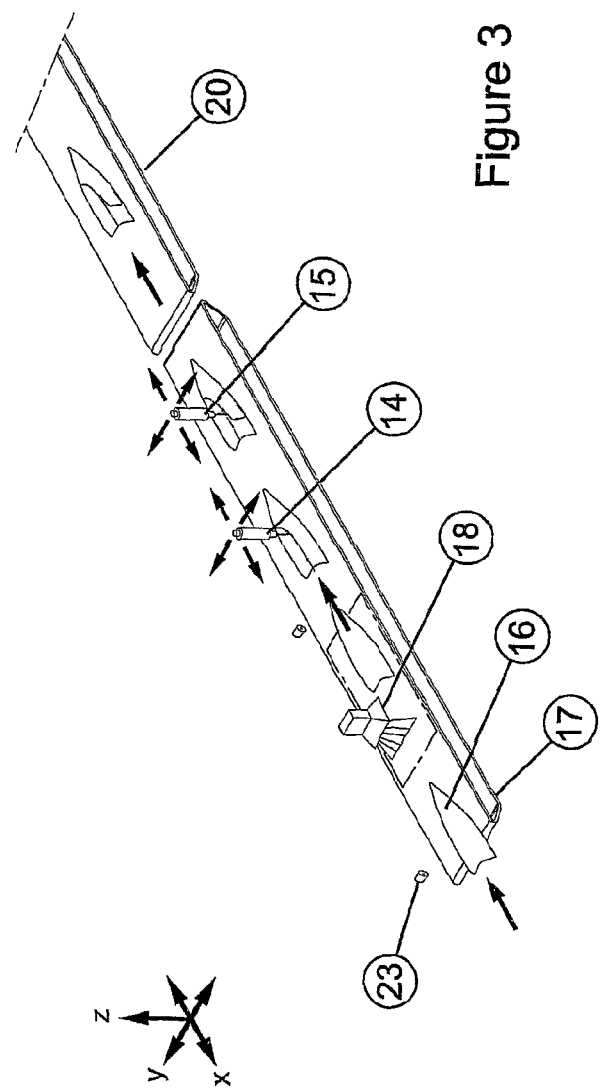

Figure 1:
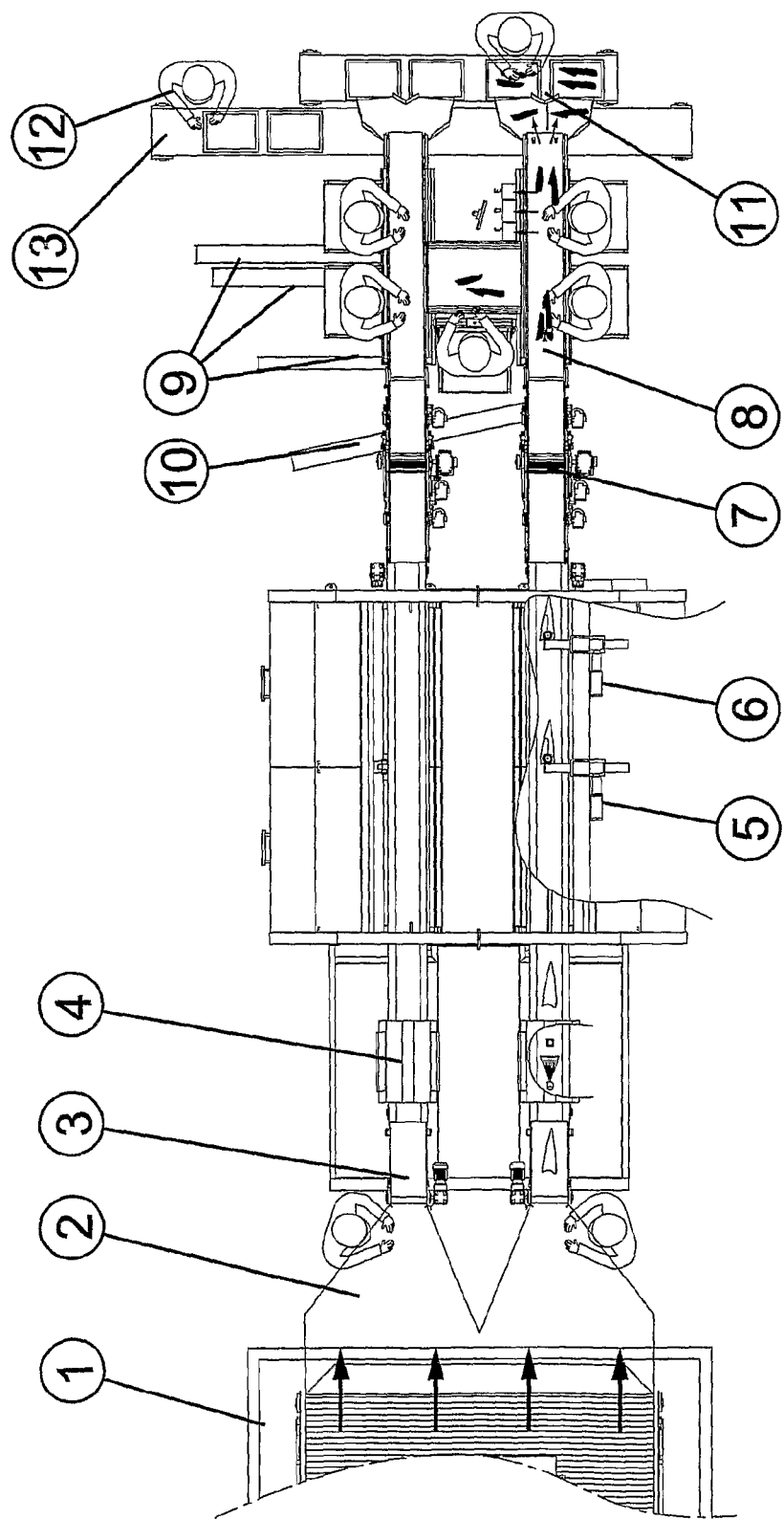

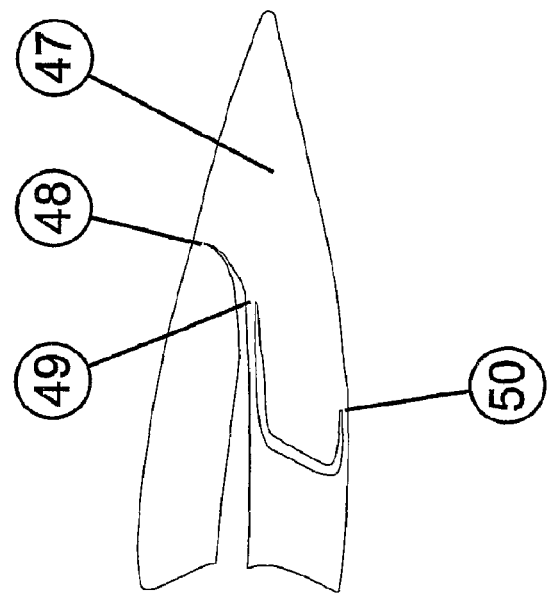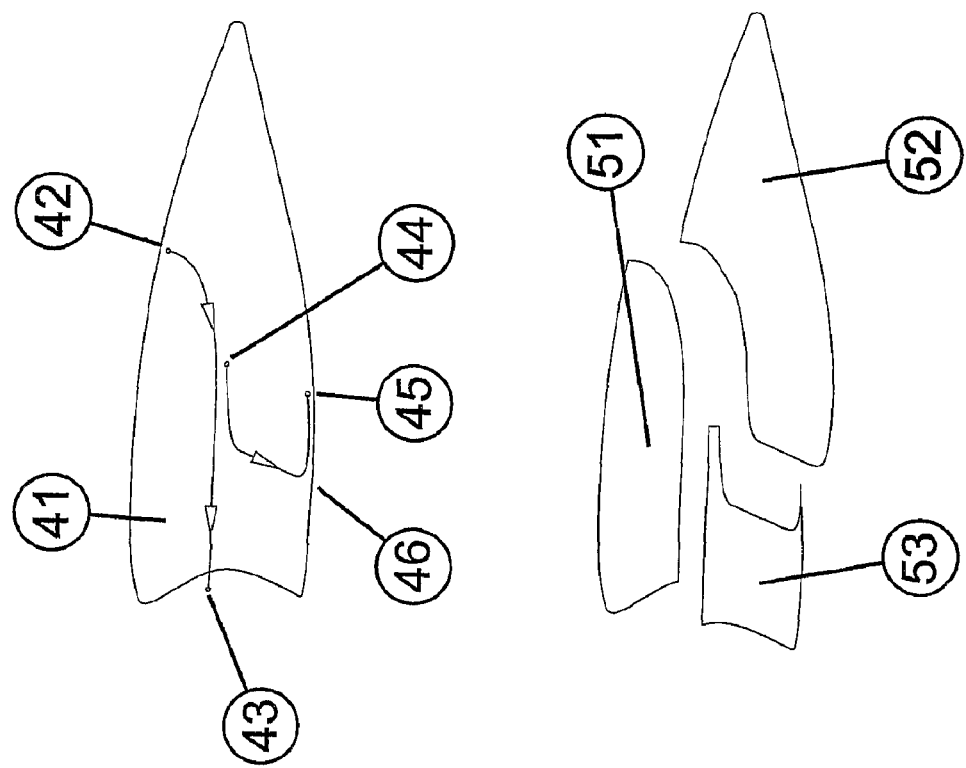
Figure 12

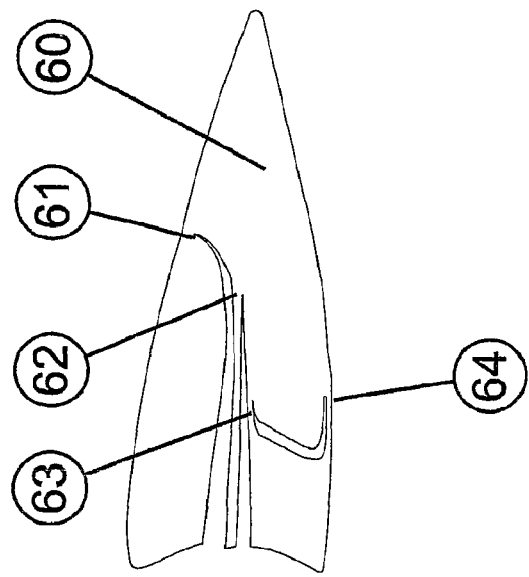
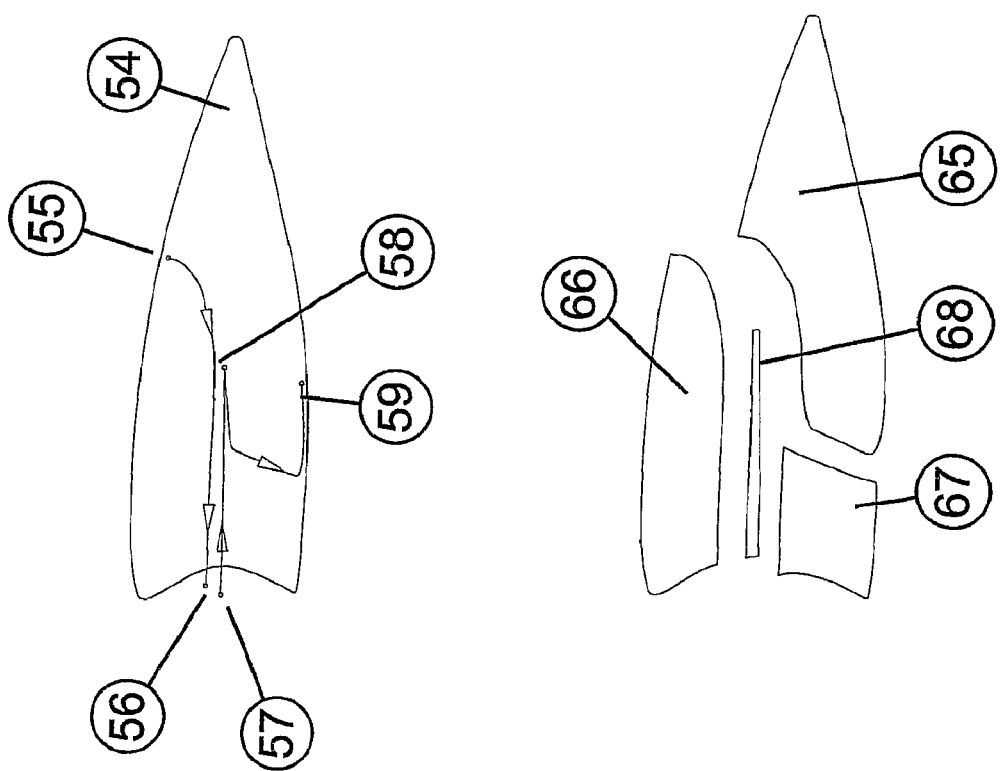
Figure 13

METHOD AND AN APPARATUS FOR AUTOMATIC BONE REMOVAL

FIELD OF THE INVENTION

The invention provides a method for bone removal and trimming of products such as fish fillets with a new method based on cutting with a water beam. This gives possibilities for new and more valuable products, such as neck pieces with skin, than with conventional methods due to known position of the bones.

BACKGROUND

A continuous development of food processing, such as fish products, has taken place in the past decades. A big effort has been put into increasing utilization and value of the product as well as meeting demands for higher throughput and efficiency in processing.

Traditional methods for bone removal include manual trimming fish fillets as well as removal of pin bones. These manual methods are labour intense and time consuming and such processing is giving way in competition to methods based on automated and more efficient processing.

A technology has been developed for searching for bones in fish fillets, analyses, locates and removes the bones with gripping devices, which tears the bones from the fillet. The efficiency of such device, because results of bone removal, has not shown to be satisfactory.

Another disadvantage associated with this technology is that the fish fillets are skinned using traditional skinning devices, which causes deforming of the fillets, gapping occurs making location of pin bones inaccurate as well as increasing the risk of bones moving in the fillet and ending up in locations where the device has a difficulty in finding and locating the bones. The result of this has been manual searching and locating remaining bones using expensive bone scanning device. Such device uses x-ray scanning for locating the bones and a certain group of consumers refuses products that have been treated with x-ray.

Separation of food products, such as fish fillets, chicken fillets, and many others, by using water jet cutting is known in the art. U.S. Pat. No. 4,962,568 discloses how food products are cut to predetermined portion sizes or to predetermined profile shapes, by scanning the items with a camera capable as they move on a conveyor. The camera provides a programmed computer with dimensional data, and utilizes the computer to control the operation of a plurality of high pressure water jet cutters to cut the food products to reduced sizes as dictated by the computer program.

U.S. Pat. No. 5,551,190 discloses an arrangement for fluid jet cutting of food products. The arrangement comprises a movable nozzle which is on a frame. The plant for fluid jet cutting comprises a belt conveyor for moving the products, a device for analyzing the characteristics of the products to be cut, and a device for controlling the operation of the fluid jet arrangement for cutting the products on the conveyor in response to commands from the analyzing device.

Prior art arrangements using water jet cutting are not considered optimal for processes such as removing pin bones from fish fillets, as the back flush from the cutting water beam does interrupt the precise location of pin bones in fillets and the cut in the meat is not sharp enough and close enough to the pin bones. This is because the flesh in traditional state is delicate with soft texture and deforms during cut by the water jet beam. This leads to reduction in yield and value when processing fillets. Moreover, the known water jet arrangements are quite complicated.

Conventional methods including methods using water jet cutting are based on skinning the fillets before bone removal preventing processing valuable products with the skin attached, such as loin pieces or salted flap with skin. Further more traditional skinning causes deforming of the fillets and gapping occurs making location of pin bones inaccurate as well as increasing the risk of movement of bones in the fillet giving problems finding and locating the bones.

U.S. Pat. No. 6,825,446 discloses a technology which can be used for cooling the products, such as fish fillets, to the under-cooled state by using the Combined Blast and Contact cooling method. This gives the necessary precise control of the cooling and an effective cooling for bringing the fillets to the under-cooled state.

Conventional methods are therefore limited to providing skinless products. Conventional methods have a further disadvantage in that the temperature of the product increases during the processing decreasing storage life and quality. These conventional methods have been used until now instead of the manual way of removing pin bones and trimming fish fillets using a complex and expensive devices as well as involving shortage of efficiency to give satisfactory results.

SUMMARY OF THE INVENTION

It is the aim of the present invention to provide a method, which can be used for processing fish fillets, such as cutting and removal of pin bones, which increases efficiency of the processing and value of the product. Further more it is the aim of the invention to process fillets in a way that allows more precise cuts giving improved yield than prior methods.

It is further an object of the present invention to increase efficiency of processing products and solve problems of processing products in a more efficient way than prior methods.

The invention provides a method for bone removal and trimming of products such as fish fillets with a new method based on cutting with a water beam where the product is in an under-cooled state. The product, for example a fish fillet, is cooled down to the phase transition of freezing. The product is feed onto a conveyor belt which transports the product to a camera with a laser scanner device which provides a three dimensional model of the product and compares the image to known fillets and a cutting pattern is determined from that comparison. The product is in a relative still position during cutting to enable accurate cutting and a product such as a fish fillet is trimmed or portioned before skinning. Furthermore the cutting is performed without first removing the skin from the fillet enabling more precise positioning and location of pin bones. This gives possibilities for new and more valuable products, such as neck pieces with skin, than with conventional methods due to known position of the bones.

In a first aspect of the present invention a method is disclosed for processing food items such as chicken pieces or fish fillets. The method comprises the steps of:

bringing the food items to an under-cooled state,
digital imaging of the food items
selection of a cutting pattern from a plurality of cutting patterns, and
cutting the food items in an under-cooled state with at least one water beam through a nozzle, where at least a part of bones or undesired tissue is removed.

In the present context the items are transported through the whole processing of the method on conveyors. Furthermore, the cutting is performed on the food items in an under-cooled state and the temperature of the food items is in the 0° C. to −1.5° C. temperature interval.

In an embodiment of the present invention, a three dimensional model is created and the information used for grading the items after processing based on characteristics such as shape, size and the weight of the food items. This information can be used later in the processing.

In an embodiment of the present invention, a fish fillet is being cut and the cutting pattern is determined so that a loin piece and/or the rest of the fillet is not skinned during the process.

According to the present invention the food items are cut before and/after skinning. The food items may be cut in a still position with at least one water beam through a cutting nozzle or in a relative still position between the cutting nozzle and the continuously moving food items. Furthermore, the cutting is performed with movable nozzles which can be tilted in a plane perpendicular to the movement of the food items or with movable nozzles which can be tilted in a plane perpendicular to the movement of the food items and where the tilt of the nozzle is adjusted to the variable angle of the pin bones in the food items.

In an embodiment of the present invention the first nozzle cuts one cutting track and the second nozzle cuts another track in the food items. The cut may exclude an area between the cutting tracks or it may exclude a marginal area close to the edge of the food items.

In an embodiment of the present invention the cutting is performed with a nozzle where the height of the nozzle can be adjusted according to the thickness of the food items. Furthermore, the cutting may involve trimming the food items.

In an embodiment of the present invention the skinning is performed on a fillet wherein the cut excludes a marginal area close to the edge of the fillet and the cut excludes an area between the cutting tracks. The skinning can also be performed with a device for skinning the fillet where the in-feed conveyor is lifted towards the cutting device for guiding a part of the fillet past the skinning knife.

In a second aspect of the present invention an apparatus is provided for processing food items such as chicken pieces or fish fillets, where the apparatus comprises the following:

means for bringing the food items to an under-cooled state,
means for performing an imaging analysis of the food items,
means for calculating cutting patterns based on the data from the imaging analysis of the food items,
means for cutting or trimming the food items according to the method described above.

In the present context the items are transported through the whole processing of the method on conveyors. The apparatus may further comprise means for skinning the food items. In an embodiment of the present invention the skinning involves an in-feed conveyor being lifted towards the cutting device for guiding a part of the fillet past the skinning knife.

In an embodiment of the present invention the device comprises a skinning device. The skinning device comprises the following:

a conveyor belt
a sensors, which registers the fillet arriving,
a clamp,
a drum,
a knife,
a clamp, which turns around an axis and supports the skin as the knife skins the fillet, and
a drive mechanism, where the sensors are used for measuring the length of the fillet for precisely controlling the function of the skinning machine,
where the signal from a sensor stops the conveyor if the previous fillet is still present in the machine,
where the clamp turns around an axis for precise adjustment to the drum, and
where the bracket supports the axis and the drum and the drive mechanism revolves the arrangement. The skinning device operates according to a method disclosed in the detailed description.

In an embodiment of the present invention a method and an apparatus are provided for processing fish or fish fillets with the aim of increase quality and efficiency of the processing and to remove at least part of the pin bones, wherein the method and the apparatus comprises the steps of:

Under-cooling of the fillet before processing
Processing the fish fillet in an under-cooled state with or without skin
Image analysis of the fish fillet with a digital imaging using at least two laser cameras and forming a three-dimensional model of the shape of the fish fillet using a computer software,
Comparing the model of the fish fillet to known shapes of fillets, which have been pre-programmed in the software,
Calculating the size and shape of fish pieces as compared to shape and volume of the pieces and to deliver this data into the computer system of the processing to collect information and for grading of products later on,
Selecting a cutting pattern for each fish fillet according to the shape of the fish fillet being processed,
Cutting the fish fillet with the skin attached using a water beam, wherein the cutting is performed with at least one water jet on a relative still fish fillet, and the cutting nozzle is tilted in the appropriate angle for allowing close cut to for example pin bones and the tilt is adjusted to the changing angle of the pin bones depending on the location of the pin bones in the fillet,
Skinning the trimmed fillet, where the fillet is skinned in that the some parts of the fillet may have skin attached and other parts of the fillet are skinned as required in a skinning machine which skins the fillet in an gentle way without increasing gap and damage in the fillet The method disclosed herein is based on under-cooling the food items, digital imaging of an item using at least two laser cameras and forming a three-dimensional model of the shape of the item using a computer software and an automatic removal of undesired tissue. The computer program controls the imaging of the item and makes a digital model of the item. The model is then compared to known shapes of items of the item type being processed, which are pre-programmed in the software and then the software calculates a desired cutting pattern for the removal of undesired tissue performed in another part of the device.

By making a three dimensional model of the items, the information can be used for grading based on shape, size and weight of the items and use this information later in the processing.

The computer software tracks the position of the items throughout the processing and sends the cutting pattern, selected and defined as mathematical vectors, to the cutting means in a similar manner as a computer sends a document for printing in a conventional computer. The apparatus knows the position of the item and the undesired tissue is removed by cutting and the item is portioned as desired by high pressure water beam.

In another aspect the present invention differs form prior art in that bone removal from a fish fillet is performed on a fish fillet in an under-cooled state. This allows for increased strength of the fillet, which protects the fillet against harsh treatment during processing. Furthermore, it is less difficult to locate the pin bones when the fillet is stiff providing better efficiency in bone removal than prior methods. By keeping the fillet in an under-cooled state causing stiffness, the fillet is straight and smooth and all the pin bones are in the right place, so that their position is known and cutting patterns may be calculated for the bone removal.

The fish fillet is cooled down with CBC technology. This technology involves cooling the fish fillet to the phase transition of freezing and process the fillet in an under-cooled state. When the fillet is in a under-cooled state it becomes stiffer than during conventional processing and the stiffness enables processing without the fillets loosing quality because of gapping in the flesh and further allows for removing the pin bones with more efficiency and accuracy than prior art methods.

In another aspect the present invention differs form prior art in that scanning and cutting of the fillet is performed on a fillet with the skin attached. This allows for more accurate positioning of the pin bones before bone removal and further to new possibilities of processing products with the skin attached. When the skin has not been removed, the fillet has not been subjected to the harsh treatment a traditional skinning process causes and often results in that the fillet becomes deformed and positioning of the pin bones becomes less accurate as well as the increasing the possibility of the bones becoming loose and moving around in the fillet.

When the fish fillet is being processed with the skin attached, the cutting patterns directing the cutting device are determined so that the cutting device leaves approximately 1 centimeter of the cut undone towards the edge of the fillet. This ensures that the fillet stays attached and is skinned in one piece. It is possible to process a fish fillet so that f. ex. the tail piece is skinned and the pin bones are removed simultaneously and f. ex. Loin pieces and/or flap are cut and processed with the skin attached. This function is achieved by the skinning unit which skins the fillet after cutting without handling the fillet in a harsh way. Therefore, the processing can deliver more valuable products than traditional methods as well as performing more efficiently due to increased weight of the pieces, as the skin is a part of the net weight of the product. The way to obtain this is to cut a portion, such as the loin piece, completely separated form the rest of the fillet. The rest of the fillet is skinned by a skinning device, but when the loin piece approaches the skinning device it is not skinned as it has been separated from the rest of the fillet and passes the skinning device without being skinned, as the knife of the skinning device is occupied skinning the rest of the fillet and is not able to receive new pieces for skinning meanwhile.

In another aspect the present invention differs form prior art in that the fillets are feed into a so called CBC cooler and two processing lines receive the fillets when they come out of the cooler in under-cooled state. A worker feeds the fillets alternatively onto each of the two independent processing lines and fillets are transported to scanning and cutting. After scanning, the fillet is transported to the water jet cutting unit. In the version of the arrangement described here the cutting is performed by using two cutting nozzles where each nozzle is used to cut one track in the fillet. The first nozzle cuts for example the longitudinal cut and is ready for the next fillet without using time to transport the nozzle to the return position. The second nozzle cuts the remaining track and needs less travel for cutting the next fillet.

With this embodiment, scanning and cutting devices have sufficient time to perform the cut providing a more accurate cut and the capacity is increased.

In another aspect the present invention differs form prior art in that scanning and cutting of the fillet is performed with nozzles which can be tilted an angle in a plane perpendicular to the direction of the fillet. This enables closer cut to the pin bones as the angle which the pin bones have according to the fillet varies and the tilting angle of the nozzle is adjusted to the changing angle of the pin bones.

It is possible to tilt the nozzles which produce the water beam, so that the rotate around the x-axis in a lengthwise direction of the fillet stream perpendicular to the z, y plan being athwart to the direction of the fillet stream. This provides a more accurate cutting adjacent to the pin bones and the removal of the pin bones. It is also possible to adjust the height of the nozzles in order to maintain a constant distance from the product irrespective of the thickness of the product. The water nozzles are driven by servo motors, which can control the movement of the water beam rapidly and accurately. It is also possible to have a plurality of cutting nozzles and imaging devices, so that each fillet channel uses one scanner and one cutting device, to eliminate the delay due to the movement of the scanner and the cutting device between the fillet channels thereby increasing the efficiency if desired.

The device of the present invention is implemented in a manner where the cutting devices are placed on a rack, which moves parallel to the conveyor belt so that the fillet is in a relative still position to the cutting device. In this way the movement of the fillet does not affect the quality of the product due to acceleration of the cutting device in starting and stopping the cutting nozzle providing a more efficient and accurate cutting. Furthermore, movements of the fillet are prevented due acceleration in starting and stopping as the fillet is being transported at a constant rate the whole time. The fillet is cut in a relative still position where the still position is defined as the position of the rack supporting the cutting device compared to the movement of the fish fillet on the conveyor belt.

The device can be implemented so that skinning is performed before the products are scanned and processed if required and the scanning and cutting method can further be used for trimming of fillets and other type of cutting without removing pin bones. The scanning and cutting method can also be used for trimming chicken breasts and other cutting of various products not mentioned here.

The arrangement includes a special designed skinning machine which eliminates the harsh and destructive treatment which occurs in traditional skinning machine. The design secures that the fillet does not bend or deform during skinning and the skinning machine also allows cutting the fillet before skinning. The equipment also makes it possible to process fillets where a part of the fillet remains with skin on during processing. The skinning device and the method of skinning are further disclosed below in the detailed description.

The surface or the conveyor belt, where the cutting is performed, is made from stainless steel net or any other material which can tolerate the strain of the water cutting.

DETAILED DESCRIPTION OF PREFERRED EMBODIMENTS

The present invention is described in detail below with reference to the following drawings, where each item is represented with the same number if the same number appears in more than one drawing, of which:

FIG. 1. The figure shows an overview of the system of the present invention.

Figure 2:
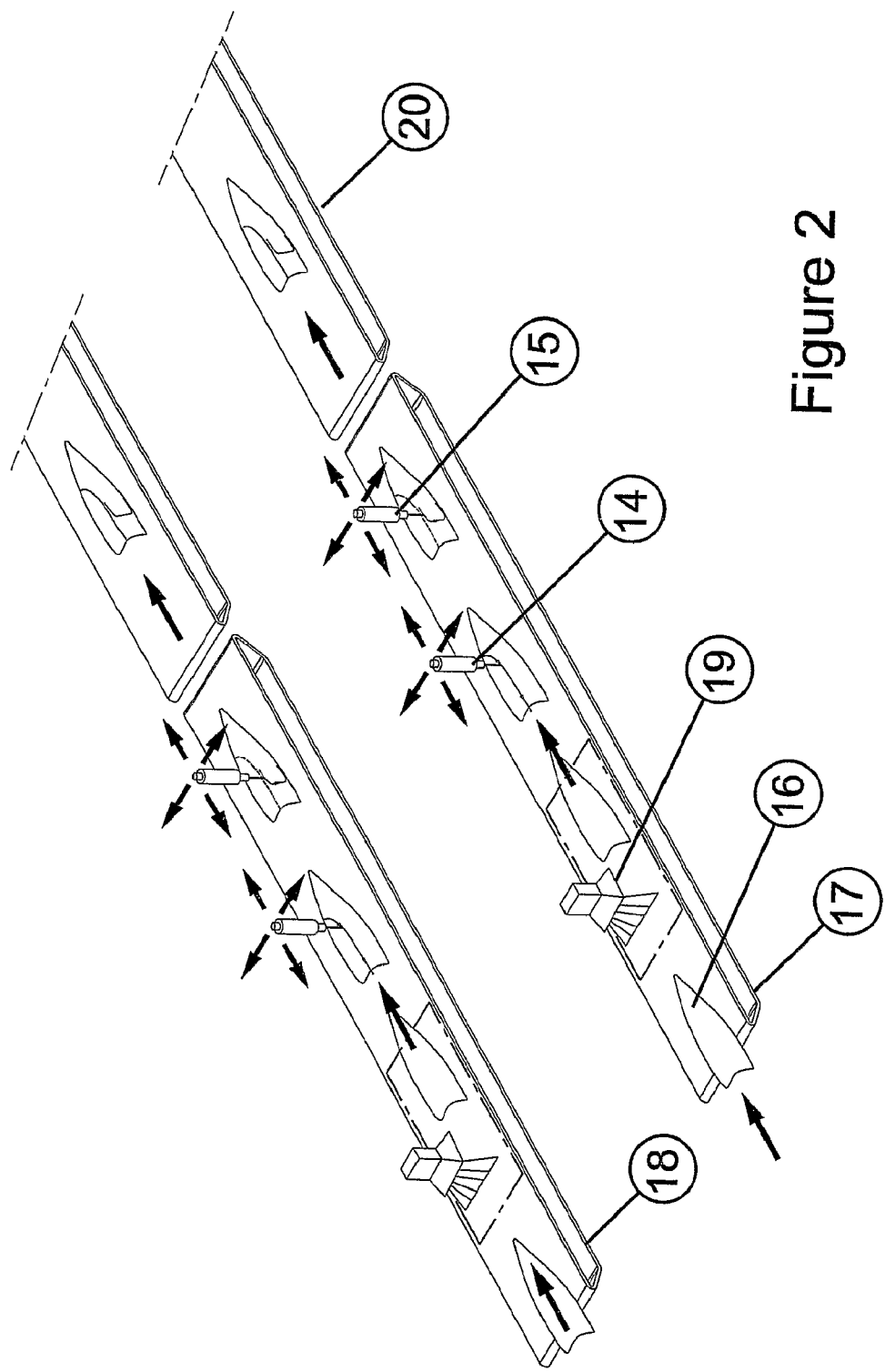

FIG. 2. The figure illustrates scanning and water-jet cutting, for two independent streams of processing.

FIGS. 3 and 4. The figures show scanning and water-let cutting illustrated in 3D and from side.

FIGS. 5-10. The figures show the principle of the skinning machine unit

Figure 11:
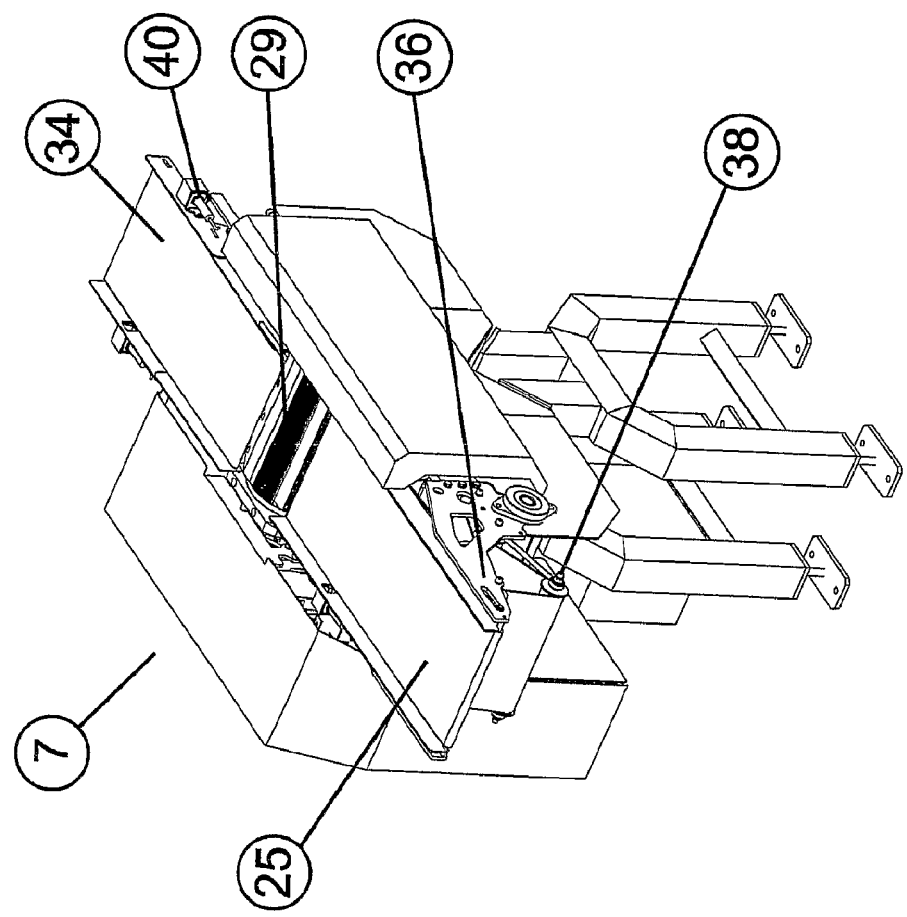

FIG. 11. The figure shows the skinning machine unit illustrated in 3D

FIG. 12. The figure shows a cut in a fish fillet where the pin bones are attached to the flap and the whole fillet is skinned.

FIG. 13. The figure shows a cut in a fish fillet where the pin bones have been removed from the flap and the whole fillet is skinned.

Figure 14:
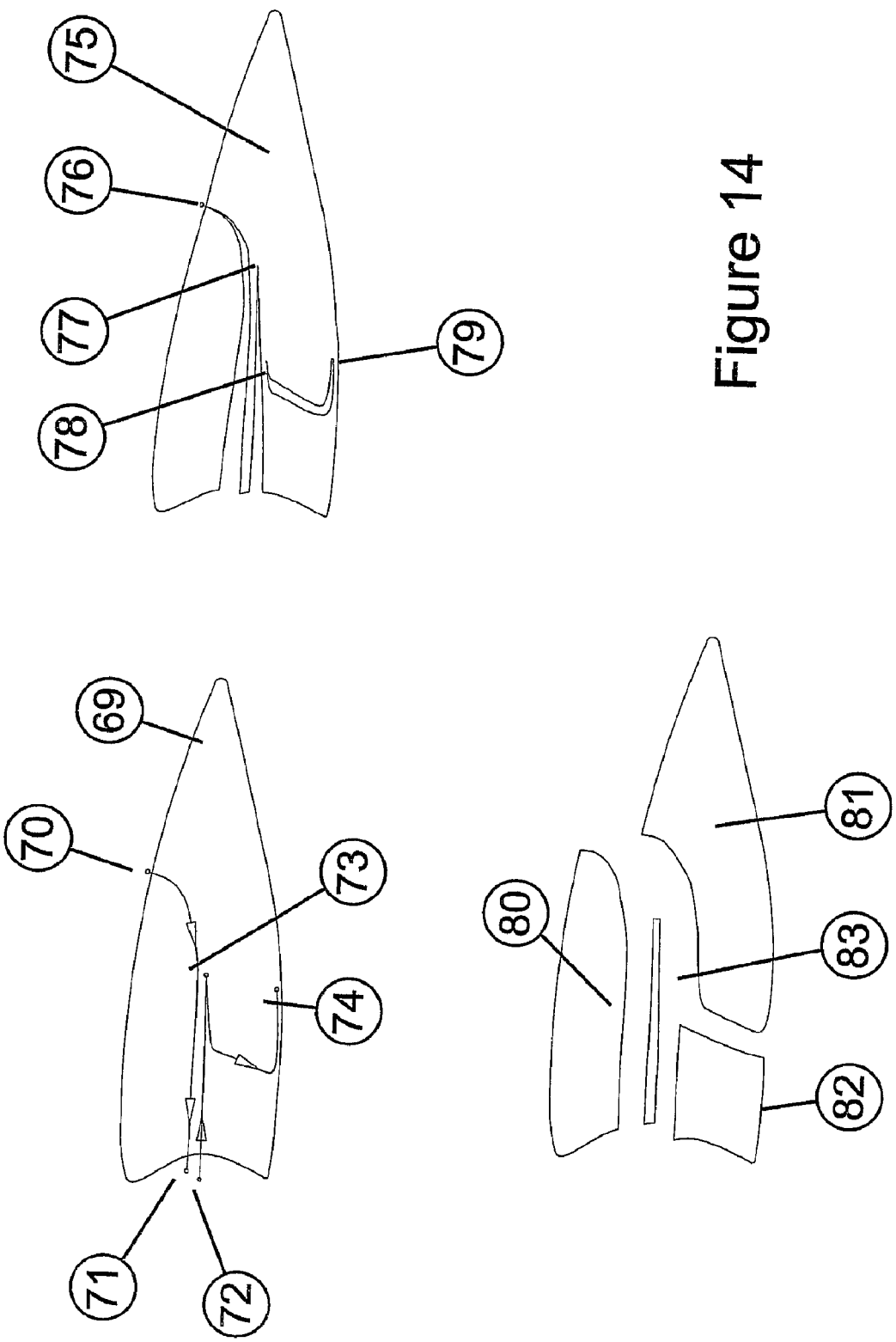

FIG. 14. The figure shows a cut in a fish fillet where the pin bones have been removed from the flap and the neck piece is cut in a way that the skin is attached to the neck piece after the fillet has been processed by the skinning device.

In the figures, a processing of fish fillets is shown, but the device and the method can apply to processing of any food items such as chicken part etc. The invention will be described in further detail, where specific parts of the invention will be referred to according to reference numbers in the drawings.

FIG. 1 illustrates an embodiment of a processing apparatus where scanning and an automatic device for bone removal and portioning of fillets. The fillets come from a CBC cooler 1, where they are brought to an under-cooled state for further processing. The fillets are collected in a lane 2 from where the workers take them and place onto an in-feeding conveyors 3, which feed the fillets to two independent processing lines.

The water cutting devices 5 and 6 are used for one track each in the same fillet for more capacity of the cutting device. The two fillet canals are independent of each other.

After scanning and cutting, the fillets move along to a skinning device 7, where one skinning device is implemented for each fillet canal.

Skinning is performed in specially designed skinning device 7. The principle of the skinning equipment is described in FIGS. 5-10. The skinning device removes the skin from the fillet in an under-cooled and stiff state without bending or shaking it. This prevents further gapping and damaging of the fillet during the processing of skinning and sensitive filets go through skinning in the same manner as fillets with no gapping without being damaged.

The skinning devices can handle fillets, which have been pre trimmed and then had the pin bones removed from them and cut and portioned by the water cutting unit. On one hand the fillets are skinned so that all the skin is removed, but it is also possible to forgo the Loin piece in that it is moved to the side so that it passes the skinning slot and thereby the skin remains attached to the Loin piece but the tail piece is skinned as described below. Skin and waste is transported away from the skinning device on conveyor 10. Portioning and final trimming is performed on processing line 8.

The trimming mainly involves inspection and final trimming of portioned and bone removed fillets. The trimming takes place on a conveyor belt made from transparent and wear resistant material and lit up from below. The worker puts the Loin piece onto the one side of the belt, trims the tail piece and puts it on the other side of the belt and removes the flap which is packed individually. Waste, flaps and for ex. IQF portions are then disposed of onto lanes and over to conveyor belts 9.

Packing and weighing of products is performed on packing station 11. Both packing and weighing are performed by the same worker, which decreases excess handling of the products. There is a workstation 12 at the end of the out feeding conveyor belt 13 for the packing line for closing the packages and put ice in the packages if so desired.

The method disclosed herein can be implemented in several ways depending on what is desired.

Scanning and Calculation

A computer device is used for control of scanning and cutting, where the computer is connected to at least two laser cameras and a cutting device. A three dimensional model is created of the fillet and the computer device compares the model to known cutting patterns in the software of the computer. The size of the pieces is calculated based on these information and there from the cutting pattern. The software of the device contains information on the shape of a plurality of fillets and the position of the pin bones in these fillets as well as pre calculated cutting patterns which are compared to the image of the fillet being processed. The accurate position of the fillet is known and the cutting device is controlled by the computer and fillet is portioned into desired pieces and the pin bones are removed.

By making a three dimensional model of the fillet it is possible to use the information for grading with respect to shape, size and the weight of the fillets or the products and use the information for later processing. The scanning process is also used to define and chose the optimal cutting pattern according to the size and shape of the fillet.

Water Jet Cutting

The water cutting is performed in a fillet with the skin attached to it. The pin bones are removed and the fillet is then portioned as desired. A high pressure water beam is used for the water cutting such as a 2000-2500 bar pressure, which is guided through a cutting nozzle such as 0, 12 mm in diameter. The water cutting is performed by a high pressure nozzles attached to a sled which moves in a horizontal x, y plane and are controlled by servo motors. The water cutting is performed on a relative still fillet, which provides increased capacity, accuracy and more elegant cutting. By relative still fillet it means that the frame for the cutting nozzle is moved in the same direction and with the same speed as the fillet on the belt.

The arrangement described in FIG. 2 show the cutting performed by using two cutting nozzles 14 and 15. The fillet 15 is transported to the conveyor belts on one of the cutting lanes 16 or 17 which are independent of each other. The scanner 18 scans the fillet and the information is used for the following cutting process. Each nozzle is used to cut one cutting track in the fillet. The first nozzle 14 cuts for example the longitudinal cutting track and is then ready for the next fillet without time is used to transport the nozzle to the return position. The second nozzle 15 cuts the remaining track and needs less travel for cutting the next fillet. Both cutting tracks in one fillet can also be performed by using a single nozzle. This will decrease the capacity compared to the method described here using one nozzle for each track. From the cutting the fillet is transported to the conveyor belt for further transport to the skinning machine 7.

The cutting nozzles may be tilted compared to the x-length axis in the moving direction of the fillets so that a rotation around the x-axis is perpendicular to the z, y plan of the nozzles. This provides leaning the nozzles and cutting closer to the pin bones resulting in better efficiency of the pin bone removal. It is further possible to adjust the height of the nozzles in order to maintain a constant distance between the nozzle and the fillet independent of the thickness of the fillet.

The embodiment illustrated in FIGS. 3 and 4 show the scanning and water-jet cutting illustrated in 3D and from side.

The fillet is placed on conveyor belt 21 which delivers to the cutting line 16. A sensor 22 registers the fillet and controls the delivery from conveyor 21 to the scanning process. This controls the delivery to the scanning and cutting process allowing more altering in-feed to the cutting process. Sensor 23 registers the fillet arriving to the scanning and the signal is used for controlling the exact position of the fillet on the conveyor belt for the following processes.

Skinning

The function of the skinning machine 7 is illustrated in FIGS. 5 to 10.

Figure 5:
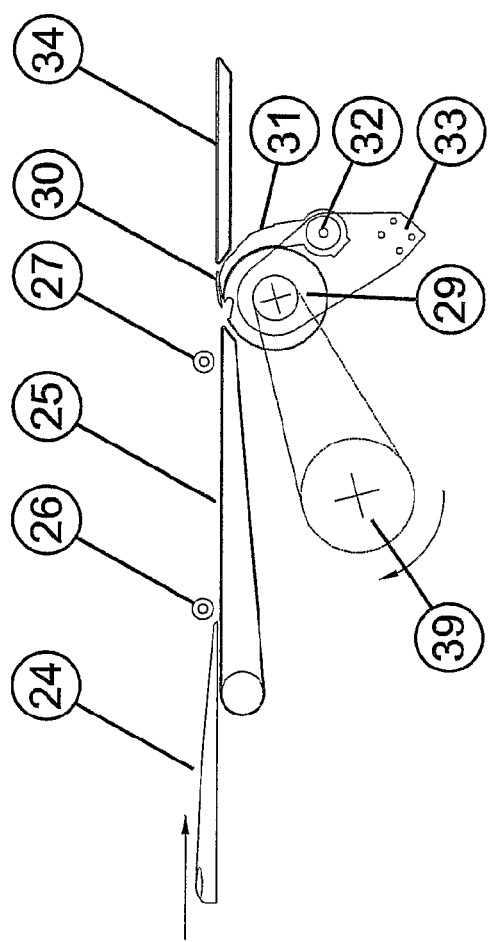

In FIG. 5 the fillet arrives on conveyor belt 25. The sensor 26 registers the fillet arriving and the sensor 26 and sensor 27 are used for measuring the length of the fillet for precisely controlling the function of the skinning machine. The signal from sensor 26 stops the conveyor 25 if the previous fillet is still present in the machine.

Figure 6:
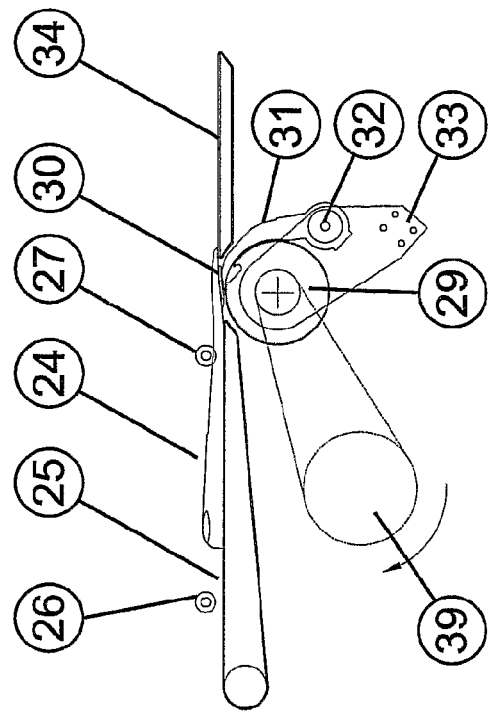

In FIG. 6 the skinning is started. The tail tip of the fillet is placed in the grove 28 on drum 29. The drum revolves clockwise and the clamp 31 supports the skin as the knife 30 skins the fillet. The fillet does not bend or twist during the skinning and due to the stiff condition in the under-cooled state the fillet is not damaged during the skinning process. The clamp 31 turns around axis 32 for precise adjustment to the drum 29. The bracket 33 supports the axis 32 and the drum 29 and the drive mechanism 39 revolves the arrangement. The fillet is transported from skinning by conveyor 34.

Figure 7:
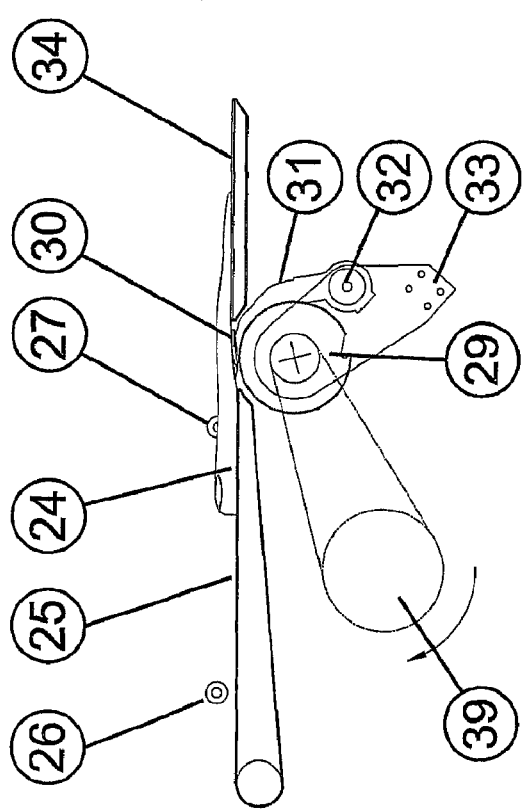
Figure 8:
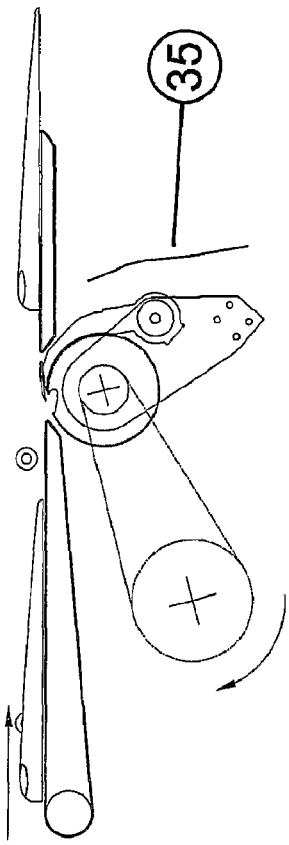

FIGS. 7 and 8 show the fillet going through the skinning process and the skin 35 is removed.

Figure 10:
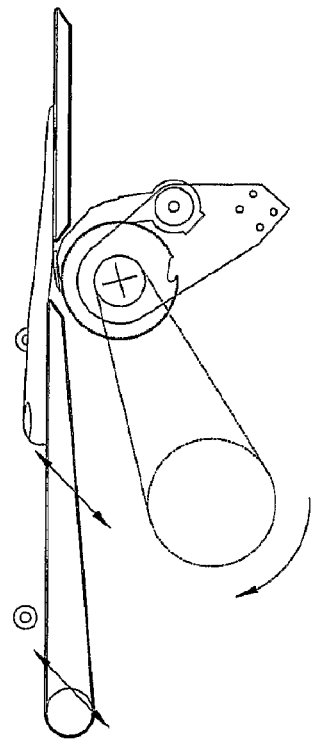
Figure 9:
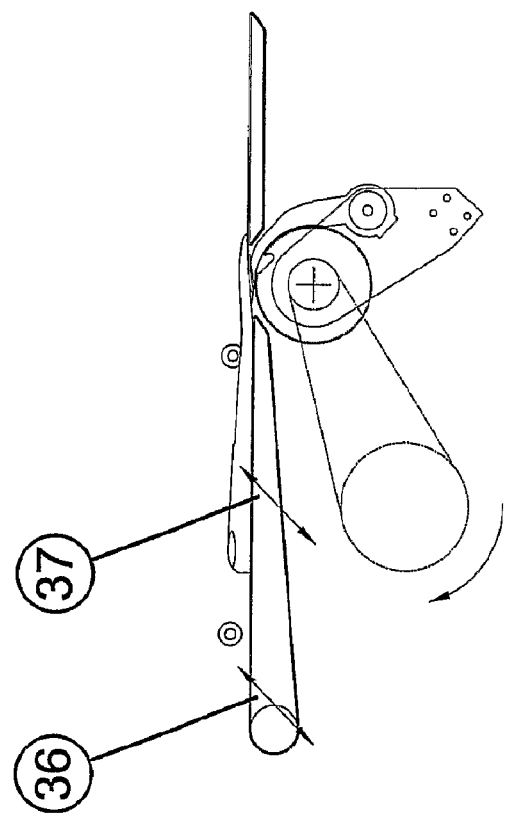

The embodiment illustrated in FIGS. 9 and 10 show the arrangement where the in-feed belt is lifted and moved towards the drum 29 as the fillet is skinned. This feature allows more precise control of the skinning process and is also necessary for controlling the bypass of portions which are not to be skinned. The whole arrangement for the in-feed belt 25 is moved in guides 36 and 37. When the fillet is cut as shown in FIG. 14 and the loin portion 80 is fully cut apart from the rest of the fillet this movement of the in-feed belt ensures that the loin portion 80 bypasses the knife 30 and remains with the skin on while the rest of the fillet is skinned.

FIG. 11 shows the skinning machine 7 in 3 dimensional views. Mechanism 38 secures the strapping of the in-feed belt 25. The sensor 40 registers when the skinned fillet has passed the skinning machine.

All methods disclosed herein above involve skinning part of the fillet or the whole fillet as desired. Therefore, the tail piece can be skinned while the loin piece has the skin attached or the whole fillet can be skinned.

FIG. 12 shows fillet where the whole fillet is skinned: This is performed by leaving c.a. one centimeter of each cut undone, when the fillet is cut. In this way the fillet is attached as it is skinned and the whole fillet is skinned by the skinning device, the fillet being in an under-cooled state and sufficiently solid due to the CBC technology. The fillet is then finally separated and examined on the post processing line.

FIG. 13 shows fillet where the Loin piece remains with the skin attached: This is performed by completing each cut, when the fillet is cut. The fillet is transported to the skinning device and the roller of the skinning device grip the tail piece, but the Loin piece with the skin attached is unattached to the rest of the fillet and is transported passed the roller and passed the skinning device. This provides a method to obtain a skinned tail piece and a Loin piece with the skin attached, where the pin bones have been automatically removed.

It is possible to tilt the cutting nozzles around the x-axis, perpendicular to the z, y plan (see FIG. 3) to obtain a more accurate cut closer to the pin bones and thereby obtain a better efficiency as compared to conventional methods. It is also possible to adjust the height of the nozzles in order to maintain a constant distance between the nozzle through the processing and the fillet to obtain increased accuracy and more elegant cutting. It is not necessary to cut the fillet with the skin attached and the device can be implemented so that skinning is performed before scanning and cutting.

It is also possible the use the method and the device of the present invention for trimming and cutting of whole fillets without removing pin bones as well as other type of processing.

FIGS. 12-14 show possible cutting patterns and products obtained by the present invention.

FIG. 12 illustrates an embodiment when the whole fillet is skinned. Fillet 41 is a fillet before cutting, wherein the cutting starts in point 42 and extends beyond the fillet to point 43. After that the nozzle 14, or the second nozzle 15, is moved to point 44 and the fillet is cut in an arch to point 45. This provides a cut passed area 46, which is the cloacae-area of the fish and is frequently contaminated with bacteria. By using this cutting pattern the amount of bacteria in the product 53 is dramatically decreased. Fillet 47 is a product where all the skin is to be removed and areas 48, 49 and 50 indicate areas on the fillet which are not cut and where the fillet is attached and can therefore be skinned in one piece. A worker on the processing line only needs to cut areas 48, 49 and 50 to portion the fillet and then place the products onto appropriate lanes for further processing of each product. Filet piece 51 is a Loin piece, fillet piece 52 is a tail piece and fillet piece 53 is flap with the pin bones attached to it.

FIG. 13 illustrates an embodiment when the whole fillet is skinned and the pin bones are removed from the flap. Fillet 54 is a fillet before cutting, wherein the cutting starts in point 55 and extends beyond the fillet to point 56. After that the nozzle 14, or the second nozzle 15, is moved to point 57 and the fillet is cut to appoint 58 beyond the pin bone area. Then the fillet is cut in an arch to point 59 as described above. In the same manner as described, for FIG. 12 the cut excludes the cloacae-area of the fish. Fillet 60 is a fillet where all the skin is to be removed and areas 61-64 indicate areas on the fillet which are not cut and where the fillet is attached and can therefore be skinned in one piece. A worker on the processing line only needs to cut areas 61-64 to portion the fillet as described above. Filet piece 66 is a Loin piece, fillet piece 65 is a tail piece, fillet piece 67 is flap and pin bones 68 are not attached.

FIG. 14 illustrates an embodiment when the a part of the fillet is skinned and the pin bones are removed from the flap, but the Loin piece is separated from the rest of the fillet and proceeds with the skin attached and passes the skinning device. Fillet 69 is a fillet before cutting, wherein the cutting with the first nozzle 14 starts in point 70 and continues by the track to point 71. After that the second nozzle 15 starts in point 72 in a continuous cut in an arch to point 74 as described above. In the same manner as described for FIG. 6, the cut excludes the cloacae-area of the fish. Fillet 75 is a fillet where the Loin piece has the skin attached and point 76 shows where the fillet is cut to separate it from the rest of the fillet. Areas 77-79 indicate areas on the fillet which are not cut and where the rest of the fillet is attached and can therefore be skinned in one piece. Filet piece 80 is a Loin piece with the skin attached, fillet piece 81 is a tail piece, fillet piece 82 is flap and pin bones 83 are not attached.

The cutting patterns may be different form the ones disclosed herein and the method of the present invention may be used to separate the whole flap from the rest of the fillet wherein the flap has the skin attached. It is possible to cut all cutting tracks in the fillet with one nozzle but this will reduce the capacity compared to use two nozzles where each is used for one track.

The device and the method of the present invention is not limited to the use for processing fish fillets, but may f. ex. be used to cut chicken pieces, such as chicken breasts and other food stuffs. The device is controlled with an industrial computer and sensors and servo motors regulate a correct movement and location on the device as well as having digital laser cameras and software to perform calculation and cutting according to predetermined cutting patterns.

The invention claimed is:

1. A method for processing food items such as chicken pieces or fish fillets, the method comprising:
    bringing the food items to an under-cooled state,
    digital imaging of the food items
    selection of a cutting pattern from a plurality of cutting patterns, and
    cutting the food items in an under-cooled state with at least one water beam through a nozzle,
    wherein at least a part of bones or undesired tissue is removed.
2. The method according to claim 1, wherein the method comprises the step of skinning the food items in an under-cooled state.
3. The method according to claim 1 or 2, wherein the cutting is performed on the food items in an under-cooled state and the temperature of the food items is in the 0° C. to −1,5° C. temperature interval.
4. The method according to claim 2, wherein the food items are cut before skinning.
5. The method according to claim 2, wherein the food items are cut after skinning
6. The method according to claim 1, wherein a three-dimensional model is created and the information used for grading based on characteristics selected from shape, size and the weight of the food items and these information are used later in the processing.
7. The method according to claim 1, wherein the food items are cut in a still position with at least one water beam through a cutting nozzle.
8. The method according to claim 1, wherein the food items are cut in a relative still position between the cutting nozzle and the continuously moving food items.
9. The method according to claim 1, wherein the cutting is performed with movable nozzles which can be tilted in a plane perpendicular to the movement of the food items.
10. The method according to claim 1, wherein the cutting is performed with movable nozzles which can be tilted in a plane perpendicular to the movement of the food items and the tilt of the nozzle is adjusted to the variable angle of the pin bones in the food items.
11. The method according to claim 1, wherein the first nozzle cuts one cutting track and the second nozzle cuts another track in the food items.
12. The method according to claim 1, wherein the cut excludes an area between the cutting tracks.
13. The method according to claim 1, wherein the cut excludes a marginal area close to the edge of the food items.
14. The method according to claim 1, wherein the cutting is performed with a nozzle and the height of the nozzle can be adjusted according to the thickness of the food items.
15. The method according to claim 1, wherein the cutting is performed with a nozzle and the area around the cloacae of the fish is removed.
16. The method according to claim 1, wherein the cutting involves trimming the food items.
17. An apparatus for processing food items such as chicken pieces or fish fillets, the apparatus comprising:
    means for bringing the food items to an under-cooled state,
    means for performing an imaging analysis of the food items,
    means for calculating cutting patterns based on the data from the imaging analysis of the food items,
    means for cutting or trimming the food items, while in an under-cooled state, according to the method described above.
18. The apparatus according to claim 17, wherein the apparatus further comprises a skinning device.
19. A method for processing food items such as chicken pieces or fish fillets, the method comprising:
    bringing the food items to an under-cooled state, and
    skinning the food items in an under-cooled state.
20. The method according to claim 19, further comprising:
    digital imaging of the food items,
    selection of a cutting pattern from a plurality of cutting patterns, and
    cutting the food items in an under-cooled state with at least one water beam through a nozzle,
    wherein at least a part of bones or undesired tissue is removed.
21. The method according to claim 19, wherein the food items are cut after skinning.
22. The method according to claim 19, wherein the processing is performed on the food items in an under-cooled state and the temperature of the food items is in the 0° C. to −1,5° C. temperature interval.
23. The method according to claim 19, wherein said food product is a fish product and wherein the method comprises removing bones from the food product in an under-cooled state.

* * * * *